(12) United States Patent
Alexandre

(10) Patent No.: US 9,115,992 B2
(45) Date of Patent: Aug. 25, 2015

(54) LASER GYRO COMPRISING A DEVICE FOR PROTECTING FROM CORROSION

(71) Applicant: THALES, Neuilly-sur-Seine (FR)

(72) Inventor: Mary Alexandre, Chatellerault (FR)

(73) Assignee: Thales, Neuilly-sur-Seine (FR)

( * ) Notice: Subject to any disclaimer, the term of this patent is extended or adjusted under 35 U.S.C. 154(b) by 81 days.

(21) Appl. No.: 13/912,532

(22) Filed: Jun. 7, 2013

(65) Prior Publication Data

US 2013/0329229 A1    Dec. 12, 2013

(30) Foreign Application Priority Data

Jun. 8, 2012    (FR) ...................................... 12 01650

(51) Int. Cl.
| | |
|---|---|
| G01C 19/64 | (2006.01) |
| G01C 19/66 | (2006.01) |
| H01S 3/083 | (2006.01) |
| H01S 3/03 | (2006.01) |
| H01S 3/038 | (2006.01) |
| H01S 3/22 | (2006.01) |

(52) U.S. Cl.
CPC .............. *G01C 19/661* (2013.01); *G01C 19/66* (2013.01); *H01S 3/03* (2013.01); *H01S 3/0388* (2013.01); *H01S 3/0835* (2013.01); *H01S 3/2222* (2013.01)

(58) Field of Classification Search
CPC ........ G01C 19/66; G01C 19/661; H01S 3/03; H01S 3/038; H01S 3/0388; H01S 3/0835; H01S 3/2222
USPC .......................................................... 356/459
See application file for complete search history.

(56) References Cited

U.S. PATENT DOCUMENTS

| | | | | |
|---|---|---|---|---|
| 5,856,995 | A | * | 1/1999 | Morris ............................. 372/87 |
| 6,025,914 | A | * | 2/2000 | Ford et al. ...................... 356/459 |
| 2004/0008351 | A1 | * | 1/2004 | Ecklund et al. ................ 356/459 |

* cited by examiner

*Primary Examiner* — Michael A Lyons
(74) *Attorney, Agent, or Firm* — Michael J. Donohue; Davis Wright Tremaine LLP

(57) ABSTRACT

A laser gyro includes an optical block manufactured from a glass-ceramic first material having apertures, electrodes placed in the apertures of the optical block, and seals ensuring the hermeticity of the optical block in the location of the apertures. The seals use indium of a first redox potential. The laser gyro furthermore includes, making contact with the seal, at least one sacrificial electrode comprising a second material of a second redox potential, the second redox potential being lower than the first redox potential.

13 Claims, 3 Drawing Sheets

LASER GYRO COMPRISING A DEVICE FOR PROTECTING FROM CORROSION

BACKGROUND

The invention relates to increasing the lifetime of a laser gyro, and more particularly to improving the corrosion resistance of a seal ensuring the hermeticity of part of the structure of the laser gyro.

A laser gyro or gyrometer allows angular velocity to be measured. FIG. 1 illustrates a schematic representation of the structure of a laser gyro.

Typically, a laser gyro comprises a rigid structure called an optical bloc 1 that is polygonal shaped, often triangular or square. The optical bloc 1 comprises a glass-ceramic material with an elastic expansion coefficient that is almost zero. In other words, over the operating temperature range of the laser gyro i.e. between −60° C. and 100° C., the glass-ceramic first material does not expand and does not contract. Specifically, the glass-ceramic first materials comprise amorphous first materials that expand, crystalline second materials that contract and mobile ions that can move between the first and second materials. Expansion of the first materials offsets the contraction of the second materials of the glass-ceramic material.

The optical bloc 1 comprises a capillary tube 2 in which a laser beam travels. The capillary tube 2 is kept under an atmosphere comprising gases such as helium or neon. Mirrors 3 are placed at each corner of the optical bloc 1 so as to transmit the laser beam. The capillary tube 2 filled with a gas mixture and the mirrors form an amplification medium for the laser beam.

The optical block 1 contains apertures 4a and the capillary tube 2 contains apertures 4b, the apertures 4a and the apertures 4b being placed facing each other so as to allow electrodes 5a and 5b to pass, which electrodes penetrate into the capillary tube 2 and generate plasma discharges inside the capillary tube 2. The anode 5a and the cathode 5b comprise a metallic material generally comprising materials such as aluminium or Invar, which are materials that have a non-negligible elastic expansion coefficient.

The hermeticity of the capillary tube 2 is ensured by a seal 6 comprising indium. Indium is known for its good corrosion resistance properties and for its mechanical properties. Specifically, this material remains flexible and malleable down to cryogenic temperatures, typically about −150° C. The seal 6 is located inside the apertures 4a in the optical block 1, thereby preventing leakage of the inert gases to the exterior, which would irreversibly damage the laser gyro.

A laser gyro is a piece of angular measurement apparatus generally intended to be fitted on board an aircraft or a submarine, for example. It may therefore be subjected to very corrosive environments such as the marine environment or to large temperature variations during the takeoff and landing of aircraft.

When the laser gyro is not in operation, the indium present on the surface of the seal, and which makes contact with oxygen in the air or water, forms a passivation layer comprising indium oxide that makes it insensitive to corrosion. When the laser gyro is in operation, the potential difference applied to the electrodes 5a and 5b inhibits the passivation of the indium of the seal 6, thereby making it sensitive to corrosion.

Moreover, the temperature variations to which the laser gyro is subjected cause the materials of the electrodes 5a, 5b to expand or contract. But, the glass-ceramic from which the optical block 1 is made has a very small expansion coefficient, leading to differential expansion between the materials of the electrodes 5a, 5b and the glass-ceramic material. The indium-comprising seal 6 compensates for the differential expansion of the two materials.

As the laser gyro is used, the indium-comprising seal 6 becomes mechanically fatigued causing micro-cracks to appear into which oxygen molecules present in the air or water infiltrate. A passivation layer forms inside the seal 6 creating oxide holes in the volume of the seal 6. The holes then together form micro-cracks.

To limit the risk of deterioration due to corrosion of the seal 6, two solutions have been proposed in the literature.

A first solution is proposed in patent application US 2004/0040941. It consists in hermetically isolating the entire laser gyro from the corrosive environment by placing it inside a package kept under an atmosphere comprising an inert gas.

Implementation of this solution is still very difficult and expensive because production of a package that is perfectly hermetic to the oxygen in air and water and that allows connectors to pass has still not been completely mastered.

An improvement to this solution consists in adding getters. Getters are easily oxidized metallic materials. In contact with oxygen they are preferentially oxidized to form a white deposit.

A second solution is proposed in the prior art. It consists in protecting the seal 6 locally by placing a protective barrier 8 on the seal 6. This barrier 8 may be an adhesive, a lacquer or a mastic that prevents oxygen from passing.

This solution has two drawbacks: on the one hand, the materials used degrade under the effect, notably, of temperature variations or the effect of the electric field applied to the electrodes 5a, 5b; on the other hand, the adhesives, lacquers or other materials placed on the surface of the seal to protect it from corrosion are not perfectly hermetic to oxygen. But, a very small concentration of oxygen may result in substantial corrosion of the seal 6.

SUMMARY

One aim of the proposed invention is not to inhibit corrosion of the seal 6 but to transfer the corrosion to another element. According to one aspect of the invention, a laser gyro is provided comprising a structure comprising a glass-ceramic first material. The structure comprises apertures, electrodes placed in the apertures of the structure, and seals comprising indium of a first redox potential ensuring the hermeticity of the structure in the location of the apertures. The laser gyro furthermore comprises, making contact with the seals, at least one sacrificial electrode comprising a second material of a second redox potential, the second redox potential being lower than the first redox potential, the sacrificial electrode being neither placed between the optical block and the seals nor between the seals and the electrodes.

A laser gyro according to one aspect of the invention therefore comprises a sacrificial anode that degrades instead of the seal which preserves its hermetic properties. Obviously, the interface between the block, the seal and the electrodes comprises no sacrificial electrode since otherwise corrosion of the sacrificial electrode would degrade the hermeticity of the device.

Moreover, the housing containing the laser gyro does not need to be hermetic, thereby making the laser gyro easier to manufacture.

Advantageously, the potential difference between the second standard redox potential of the second material and the first standard redox potential of the indium is greater than 200 mV.

The choice of such a second material increases the effectiveness of the cathodal protection.

Advantageously, the second material is placed continuously on the surface of the seal.

Alternatively, the second material is placed discontinuously on the surface of the seal, the distance between two portions of the second material being smaller than half the perimeter of the seal.

This embodiment reduces constraints on the manufacturing processes used to produce the laser gyro, in contrast to solutions provided in the prior art in which the protective layers had to contain no surface defects in order to guarantee protection of the seal.

Preferably, the amount of second material material is at least equal to the amount of indium material to be protected.

The sacrificial anode protects the seal throughout the lifetime of the laser gyro.

According to another aspect of the invention, a laser gyro is provided in which the glass-ceramic first material comprises mobile ions of a third redox potential, the third redox potential of the mobile ions being lower than the second redox potential of the second material of the sacrificial electrode.

This embodiment allows the sacrificial electrode to be regenerated and thus the duration of the protection of the seal to be prolonged.

Advantageously, the mobile ions comprise lithium ions or sodium ions.

Lithium ions are known for their high mobility, which assists with the process of regenerating the sacrificial electrode.

Preferably, the glass-ceramic material is ZERODUR®. ZERODUR® is a well-known non-porous, inorganic glass-ceramic material with low thermal expansion properties.

BRIEF DESCRIPTION OF THE DRAWINGS

The invention will be better understood on studying a few embodiments described by way of non-limiting example and illustrated by the appended drawings in which.

DETAILED DESCRIPTION

Figure 2:
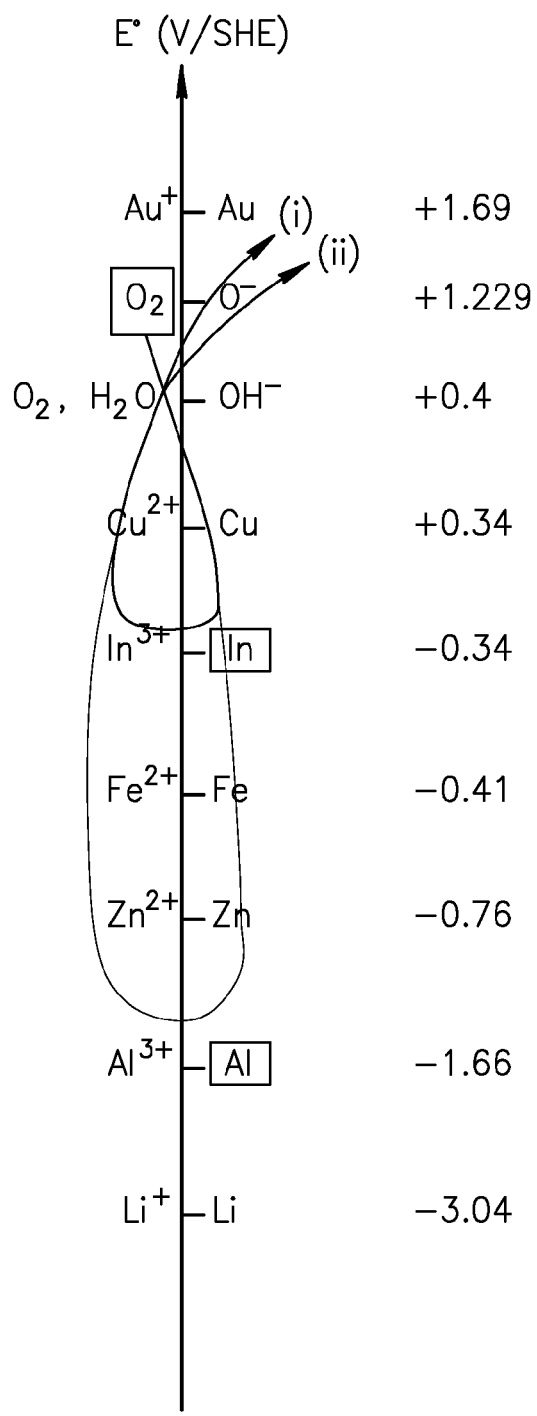
FIG. 2 shows an electrochemical potential scale for various materials.

FIG. 2 illustrates an electrochemical potential scale called the Nernst scale.

Electrochemical potential is an empirical quantity, it is expressed in volts (V) and denoted by the symbol E. This potential is expressed relative to a reference electrode. By convention, standard potential E° is measured relative to the $H^+/H_2$ pair, of potential equal to zero, serving as reference electrode. This measurement is applied to redox pairs in order to predict the reactivity of chemical species to one another. The Nernst scale, which is made up of the values of the standard potentials E° determined for various materials, classes metals according to their tendency to oxidize.

From this scale it is possible to deduce, for example, that a metal such as gold will not be attacked by oxygen because it has a higher standard electrochemical potential than that of oxygen-oxygen oxidizes more easily.

In the absence of cathodal protection, when the indium of the seal 6 is brought into contact with oxygen, it oxidizes according to the following reaction:

$$2In + 3O_2 \rightarrow 2In^{3+} + 6O^- \qquad (i)$$

The indium and oxygen ions react to form an oxide or hydroxide layer according to the following reaction:

$$2In^{3+} + 6O^- \rightarrow 2InO_3 \qquad (ii)$$

When the laser gyro is not in operation, this oxide layer, called a passivation layer, protects the indium from corrosion.

When the laser gyro is in operation, in other words when the electrodes 5a, 5b of the laser gyro are biased, the passivation layer cracks and can no longer protect the indium from corrosion.

According to one aspect of the invention, a highly electronegative second material is brought into contact with the seal 6. The second material has a standard electrochemical potential ($E°_2$) that is lower than the standard electrochemical potential of indium ($E°_{In}$=−0.34 V/SHE).

Advantageously, the potential difference between the second standard electrochemical potential ($E°_2$) of the second metal of a sacrificial anode 7 and the standard electrochemical potential of indium ($E°_{In}$) must be greater than 200 mV. Preferably, the potential difference between the second standard electrochemical potential ($E°_2$) of the second metal of a sacrificial anode 7 and the standard potential of indium ($E°_{In}$) must be greater than 500 mV, protection being more effective.

Advantageously, the second material may comprise zinc or aluminium.

The reduction reaction of the oxygen coming from the air or water preferably involves the second metal, aluminium in this case, according to the following reaction:

$$2Al + 3O_2 \rightarrow 2Al^{3+} + 6O^- \qquad (iii)$$

Specifically, the oxygen reduction reaction (iii) involving the second metal requires less energy than the oxygen reduction reaction (i) involving indium, the reaction (iii) will therefore occur first providing there are still aluminium molecules making contact with the indium-comprising seal 6.

Figure 3:
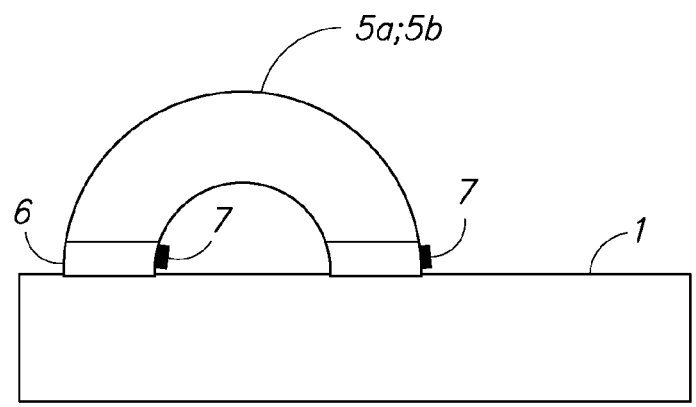
FIG. 3 shows one embodiment according to one aspect of the invention.

FIG. 3 shows one embodiment of the invention.

Figure 1:
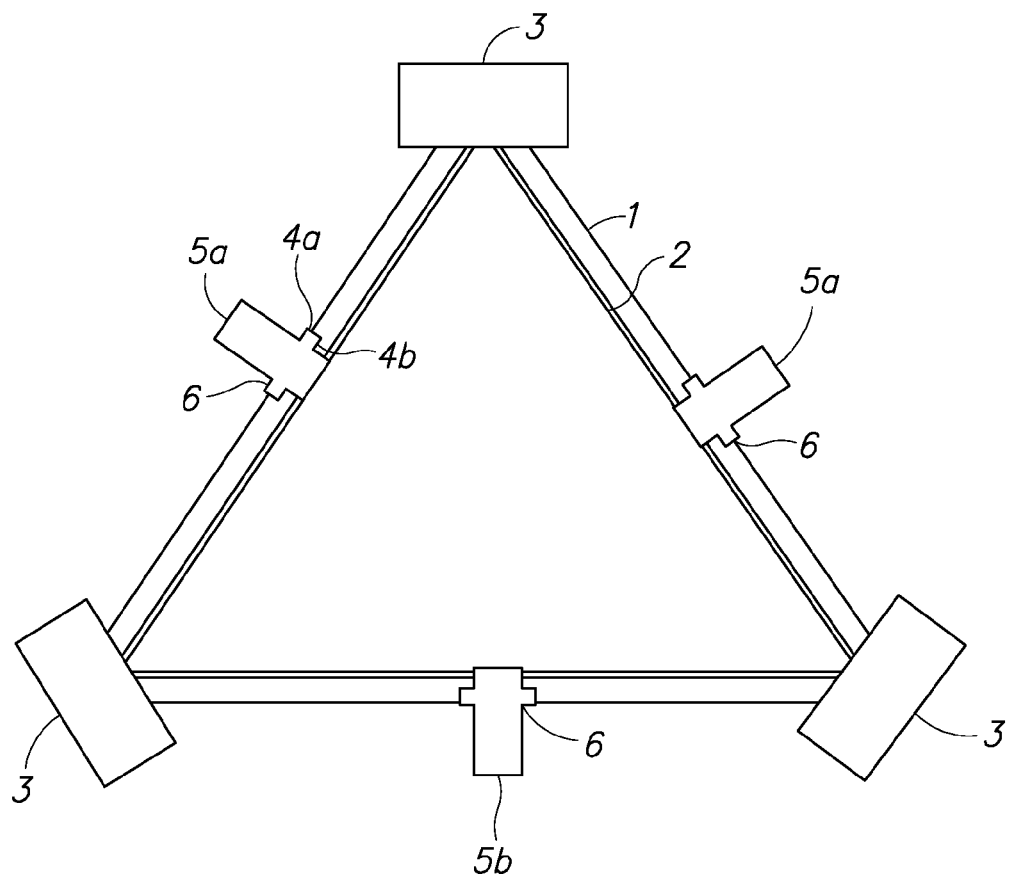
FIG. 1, described above, illustrates a schematic representation of a laser gyro according to the prior art.

The indium seal 6 located around the electrodes 5a, 5b in the location of the apertures 4a (see FIG. 1) ensures the hermeticity of the optical block 1, and more precisely the hermeticity of the capillary tube 2 of FIG. 1.

The indium-comprising seal 6 is generally produced by thermocompression of an indium-comprising wire between the optical block 1 and an electrode 5a, 5b. Pressure of between 0.1 and 1 MPa is applied to the electrodes 5a, 5b, to the indium-comprising wire, and to the optical block 1 at a temperature between −150° C. and 150° C. Under the effect of the pressure the wire is crushed rupturing the passivation layer comprising an oxide or hydroxide of indium. The underlying indium then makes contact with the electrodes 5a, 5b and the optical block 1 and binds them. The indium-comprising wire then forms a seal 6 that is between 50 and 200 microns in thickness. The indium-comprising seal 6, indium being a flexible and a malleable material, seals the optical block 1.

The sacrificial anode 7 comprising the second material making contact with the seal 6 may be produced before or after the seal 6 has been formed by thermocompression.

FIG. 3 shows an electrode 5a, 5b bound to an optical block 1 by way of a indium-comprising seal 6. The sacrificial anode 7 is placed on the side of the seal 6.

The sacrificial anode 7 is produced by depositing the second material, the deposition process may be a chemical deposition process, for example a chemical vapour deposition (CVD) process, or a physical deposition process, sputtering for example. The second material possibly comprises zinc or aluminium or any other material provided the potential difference between the standard electrochemical potential of the second material $E°_2$ and the standard electrochemical potential of indium $E°_{In}$ is greater than 200 mV.

According to another variant of the invention, the sacrificial anode may be placed around the electrode 5a, 5b so as to form a ring, or discontinuously on only part of the electrodes 5a, 5b. Preferably, the distance between two portions of the constituent second material of the sacrificial anode 7 must be smaller than half the perimeter of the seal 6. It is however essential that part of the sacrificial anode 7 makes contact with the seal 6.

Preferably, the amount of second material material is at least equal to the amount of indium material to be protected.

Advantageously, the sacrificial anode 7 benefits from local protection 8 allowing corrosion of the sacrificial anode 7 to be slowed by limiting the concentration of oxygen making contact with the sacrificial anode 7, thereby prolonging the lifetime of the sacrificial anode 7 and therefore the hermeticity provided by the seal 6.

During the lifetime of the laser gyro, the latter is subjected to aggressive environments, the suggested device allows the lifetime of the seal 6 to be prolonged. When the laser gyro, according to one aspect of the invention, is brought into the presence of oxygen, the protective barrier 8 consisting of a layer of lacquer, adhesive or mastic allows the corrosion of the sacrificial anode 7 to be slowed. However, mechanical stresses to which the protective layer 8 is subject may damage it and create cracks, as indicated above; the sacrificial anode 7 is then preferentially corroded, thereby preventing premature deterioration of the seal 6. Protection of the seal 6 is ensured by the sacrificial anode 7 as long as some of the second material remains in metallic form. When no more second material remains in metallic form, the indium present in the seal 6 reacts with oxygen from the environment according to the reactions (i) and (ii), the seal 6 then degenerates and loses its ability to seal.

To further increase the lifetime of the seal 6, it is proposed, according to another aspect of the invention, for the sacrificial anode 7 comprising a second material of second standard electrochemical potential $E°_2$ to be placed in contact with the optical block 1.

According to this embodiment the sacrificial electrode 7 is a layer of the second material placed between the seal 6 and the optical block 1.

The optical block 1 generally comprises ZERODUR®; this material notably comprises an amorphous structure, a crystalline structure, and the free ions ensuring the transition between these two structures. ZERODUR® comprises various oxides such as silicon oxide, aluminium oxide, phosphorus oxide, magnesium oxide, zinc oxide, silicon oxide, potassium oxide, etc. It furthermore comprises free lithium ions ($Li^+$); the oxidant/reductant pair $Li/Li^+$ possesses a third standard electrochemical potential $E°_{Li}$ that is lower than the second standard electrochemical potential $E°_2$.

Subjected to the electric field generated by the anode 5a and the cathode 5b, the lithium ions migrate towards the electrodes 5a, 5b, the anode 5a being biased slightly negatively. However, the lithium ions also in part migrate towards the seal 6.

Migration of lithium ions directly onto the seal 6 must be avoided since this results in corrosion of the lithium forming lithium oxide. Specifically, a lithium oxide layer degrades the bond between the seal 6 and the electrodes 5a, 5b, thereby reducing the strength with which the seal 6 adheres to the electrode 5a, 5b.

An effective design, known in the art, for the sacrificial anode 7 causes lithium ions to preferentially migrate towards it instead of migrating towards the seal 6.

Figure 4:
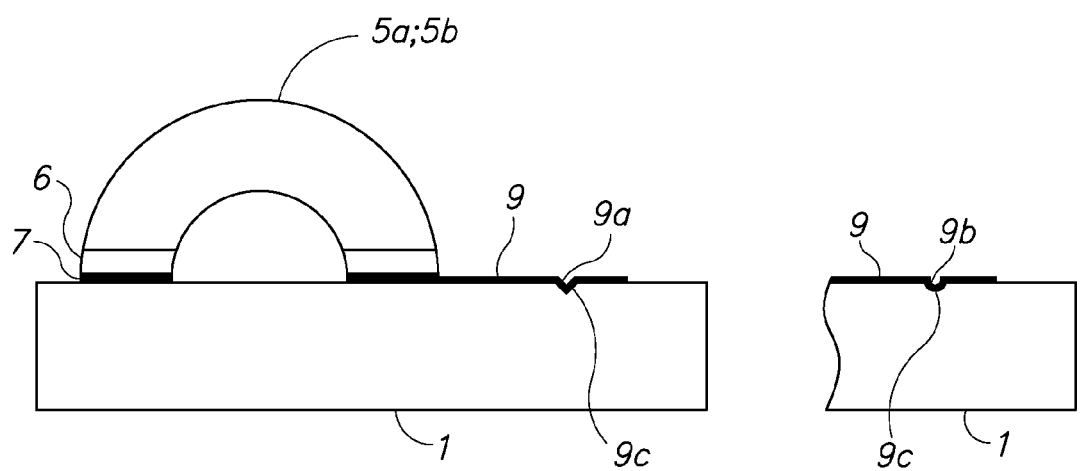
FIG. 4 shows a particular configuration for the sacrificial electrode according to one aspect of the invention.

FIG. 4 shows one embodiment of a sacrificial electrode 7 allowing lithium ions to be preferentially attracted towards it.

In FIG. 4, the sacrificial electrode 7 is placed around the seal 6. The sacrificial electrode 7 has a distal part 9, the distal part 9 containing at least one pointed indent 9a resting in a blind hole 9c.

Alternatively, the distal part 9 contains a groove 9b.

The elements 9a and 9b of the distal part 9 allow, via a physical process called the "point effect", the potential of the distal part 9 to be increased relative to the potential of the sacrificial electrode 7. This increased potential will preferentially attract lithium ions and thus decrease the attraction of lithium ions to the seal 6.

Lithium ions making contact with the cathode may fix, notably, one excess electron on the surface of the cathode, in order to form neutral lithium. The neutral lithium therefore makes contact with the sacrificial anode 7, in this case with an aluminium-comprising anode 7 some of which is oxidized by the surrounding oxygen. The sacrificial anode therefore comprises $Al^{3+}$ ions that generally take the form of an oxide $Al_2O_3$, the following reactions then occur:

$$Al_2O_3 \rightarrow 2Al^{3+} + 3O^{2-} \qquad (iv)$$

$$Al^{3+} + 3Li \rightarrow 3Li^+ + Al \qquad (v)$$

The corrosion product of the sacrificial anode 7, in this case aluminium oxide, is then reduced according to the reaction (v) to form aluminium again.

Thus, the lithium formed from the free lithium ions originating from the glass-ceramic first material allow the sacrificial electrode 7 to be regenerated thereby prolonging the lifetime of the sacrificial electrode 7 and thus prolonging the lifetime of the seal 6.

Advantageously, the effect of regenerating the sacrificial anode is easily detectable. Specifically, on returning to its metallic form, the sacrificial electrode 7 becomes sensitive to electromigration. The material of the sacrificial electrode 7 is subjected to the electric field of the electrodes 5a and 5b and moves towards them.

The proposed laser gyro ensures that the seal 6 has a longer lifetime, thereby permitting the laser gyro to be used for 20 to 25 years without maintenance of the seal 6 or replacement of the sacrificial anodes 7 being required.

The invention claimed is:

1. Laser gyro comprises an optical block comprising a glass-ceramic first material comprising apertures, electrodes placed in the apertures of the optical block, and seals comprising indium of a first redox potential ($E°_1$) ensuring the hermeticity of the optical block in the location of the apertures, characterized in that the laser gyro furthermore comprises, making contact with the seals, at least one sacrificial electrode comprising a second material of a second redox potential ($E°_2$), the second redox potential ($E°_2$) being lower than the first redox potential ($E°_1$), the sacrificial electrode being neither placed between the optical block and the seals nor between the electrodes and the seals.

2. Laser gyro according to claim 1, in which the second material is placed continuously on the surface of the seal.

3. Laser gyro according to claim 1, in which the second material is placed discontinuously on the surface of the seal.

4. Laser gyro according to claim 3, in which the distance between two portions of the second material is smaller than half the perimeter of the seal.

5. Laser gyro according to claim 1, in which the potential difference between the second redox potential ($E°_2$) and the first redox potential ($E°_1$) is greater than 200 mV.

6. Laser gyro according to claim 5, in which the second material is placed continuously on the surface of the seal.

7. Laser gyro according to claim 5, in which the second material is placed discontinuously on the surface of the seal.

8. Laser gyro according to claim 7, in which the distance between two portions of the second material is smaller than half the perimeter of the seal.

9. Laser gyro according to claim 1, in which the amount of second material is at least equal to the amount of indium material.

10. Laser gyro according to claim 1, in which the glass-ceramic first material makes contact with the second material of the sacrificial electrode, the glass-ceramic first material comprising mobile ions of a third redox potential ($E°_3$), the third redox potential ($E°_3$) of the mobile ions being lower than the second redox potential ($E°_2$) of the second material of the sacrificial electrode.

11. Laser gyro according to claim 10, in which the sacrificial electrode comprises a distal part having at least one pointed indent or/and a groove forming a blind hole in the glass-ceramic first material.

12. Laser gyro according to claim 10, in which the mobile ions comprise lithium ions or sodium ions.

13. Laser gyro according to claim 10, in which the glass-ceramic material is ZERODUR®.

* * * * *